United States Patent
Ishikawa et al.

(10) Patent No.: US 9,849,755 B2
(45) Date of Patent: Dec. 26, 2017

(54) AIR FLOW DIRECTION ADJUSTING DEVICE AND VEHICLE AIR CONDITIONING DEVICE

(71) Applicant: NIHON PLAST CO., LTD., Shizuoka (JP)

(72) Inventors: Sadao Ishikawa, Shizuoka (JP); Takashi Suzuki, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 712 days.

(21) Appl. No.: 14/307,279

(22) Filed: Jun. 17, 2014

(65) Prior Publication Data

US 2015/0004897 A1 Jan. 1, 2015

(30) Foreign Application Priority Data

Jun. 27, 2013 (JP) .................................. 2013-135004

(51) Int. Cl.
*B60H 1/34* (2006.01)

(52) U.S. Cl.
CPC ... *B60H 1/3421* (2013.01); *B60H 2001/3464* (2013.01)

(58) Field of Classification Search
CPC .............. B60H 1/3421; B60H 1/3464; B60H 1/00685; B60H 1/00671; B60H 2001/3464; B60H 2001/00714; B60H 2001/00721; B60H 2001/3492
USPC ................................................ 454/115, 162
See application file for complete search history.

(56) References Cited

U.S. PATENT DOCUMENTS

| | | | | |
|---|---|---|---|---|
| 4,750,410 A | * | 6/1988 | Parker | B60H 1/34 454/155 |
| 6,059,653 A | * | 5/2000 | Gehring | B60H 1/3428 454/155 |
| 2004/0002298 A1 | * | 1/2004 | Osada | B60H 1/3421 454/155 |

(Continued)

FOREIGN PATENT DOCUMENTS

| | | | |
|---|---|---|---|
| CN | 202442307 U | 9/2012 | |
| FR | 2925400 A1 * | 6/2009 | ........... B60H 1/3421 |

(Continued)

OTHER PUBLICATIONS

"CN_202442307_U_M—Machine Translation.pdf"; English machine translation; EPO; dated Jan. 21, 2017.*

(Continued)

*Primary Examiner* — Gregory Huson
*Assistant Examiner* — Daniel E Namay
(74) *Attorney, Agent, or Firm* — Arent Fox LLP

(57) ABSTRACT

An air flow direction adjusting device is provided with a first rear fin and a second rear fin which are adjacent to each other. At a rear fin main body of the first rear fin of these two rear fins that are adjacent to each other, a protrusion portion is provided in a thickness direction. At a rear fin main body of the second rear fin of the above two rear fins that are adjacent to each other, a recessed portion configured to close a gap between the first rear fin and the second rear fin that are adjacent to each other by the recessed portion coming into contact with the protrusion portion is provided in proximity to a rear turning shaft portion.

9 Claims, 7 Drawing Sheets

(56) References Cited

U.S. PATENT DOCUMENTS

2005/0239391 A1* 10/2005 Shibata ................ B60H 1/3421
454/155
2013/0012114 A1* 1/2013 Kong ................... B60H 1/3421
454/145

FOREIGN PATENT DOCUMENTS

| FR | 2968068 A1 | * | 6/2012 | ........... B60H 1/3421 |
|----|------------|---|--------|----|
| FR | 2968068 A1 |   | 6/2012 |    |
| JP | 63-60834 U |   | 4/1988 |    |
| JP | 2004142713 A | * | 5/2004 |  |

OTHER PUBLICATIONS

"FR_2968068_B1_M—Machine Translation.pdf"; English machine translation; EPO; dated Jan. 21, 2017.*
Chinese Office Action of related Chinese Patent Application No. 201410302641.2 dated Jun. 30, 2016.
Chinese Office Action of related Chinese Patent Application No. 201410302641.2 dated Feb. 8, 2017.

* cited by examiner

AIR FLOW DIRECTION ADJUSTING DEVICE AND VEHICLE AIR CONDITIONING DEVICE

CROSS REFERENCE TO RELATED APPLICATIONS

This application claims priority of Japanese Patent Application No. 2013-135004 filed on Jun. 27, 2013. The contents of this application are incorporated herein by reference in their entirety.

BACKGROUND OF THE INVENTION

1. Field of the Invention

The present invention relates to an air flow direction adjusting device provided with a fin which is capable of opening and closing a ventilation passage by way of turning operation and a vehicle air conditioning device provided with the air flow direction adjusting device.

2. Description of the Related Art

Conventionally, in an air conditioning device which is employed in a vehicle such as an automobile, an air flow direction adjusting device which is provided in a blowout opening configured to blow out a flow of air is also referred to as an air conditioning blowout device, an air outlet, a ventilator, or a register or the like, is installed at each part of a vehicle such as an instrument panel or a center console, for example, and contributes to an improvement of performance for amenity exerted by air heating or cooling.

In so far as such an air flow direction adjusting device is concerned, it has been known that there is provided a construction in which fins serving as a plurality of air flow direction adjusting vanes are disposed in a horizontal manner, for example, so as to be turnable together in parallel to each other, and by way of these fins, a ventilation passage is opened and closed. The construction mentioned above is made in such a manner that a protrusion portion is provided in one of the fins that are adjacent to each other, a recessed portion is provided in the other one, and in a fully open position at which ventilation passage is closed by way of the fins, the protrusion portion and the recessed portion are engaged with each other. In this manner, a gap between the fins that are adjacent to each other is closed (reference should be made to Japanese Utility Model Application Publication No. 63-60834 (pages 5 to 6 and FIGS. 1 and 2, for example).

However, in the case of the construction of the air flow direction adjusting device described above, even at a fully opened position, a gap is formed between the protrusion portion and the recessed portion, and a noise or a molding dispersion of the fins is absorbed. Thus, a ventilation leakage between the protrusion portion and the recessed portion is unavoidable. In addition, it is also considered that the protrusion portion and the recessed portion are engaged with each other in a gapless manner, whereby a gap between the fins is closed. However, in this case, the protrusion portion is protrusively provided at an end part of the fin, and therefore, there may be a circumstance in which the recessed portion is subjected to compression of the protrusion portion and then the fins turn (over-strokes), and there has been a need to eliminate lowering of a shutout property of ventilation between the fins.

SUMMARY OF THE INVENTION

The present invention has been made in view of the circumstance as described above, and it is an object of the present invention to provide an air flow direction adjusting device which is capable of reliably shutting out ventilation in a ventilation passage by way of fins and a vehicle air conditioning device provided with the air flow direction adjusting device.

An air flow direction adjusting device according to a first aspect of the present invention includes:

a casing body having a ventilation passage inside of the casing body; and a plurality of fins which are disposed in a direction crossing a flow of air passing through the ventilation passage, and which is capable of opening and closing the ventilation passage by way of turning operation, wherein the plurality of fins includes a first fin and a second fin that are adjacent to each other, a respective one of the first fin and the second fin has:

a turning shaft portion which is turnably pivoted to the casing body; and a plate-shaped fin main body configured to control the flow of air passing through the ventilation passage, wherein a protrusion portion which protrudes in a thickness direction is protrusively provided at the fin main body of the first fin, and wherein a contact portion configured to close a gap between the first fin and the second fin that are adjacent to each other by the contact portion coming into contact with the protrusion portion is provided in proximity to the turning shaft portion of the fin main body of the second fin.

The air flow direction adjusting device according to a second aspect of the present invention is provided in such a manner that the contact portion is a recessed portion which is provided in a recessed manner in a thickness direction of the fin main body of the second fin.

The air flow direction adjusting device according to a third aspect of the present invention is provided in such a manner that the protrusion portion and the recessed portion are formed in shapes which are different from each other, and come into linear contact with each other.

With the air flow direction adjusting device according to the first aspect of the present invention, a contact portion configured to close a gap between fins which are adjacent to each other by the contact portion coming into contact with a protrusion portion which protrudes in a thickness direction in a fin main body of one of the fins that are adjacent to each other is provided in proximity to a turning shaft portion of the other fin main body of the fins that are adjacent to each other. In this manner, even if the contact portion is subjected to compression of the protrusion portion, a torque which is applied to the other one of the fins that are adjacent to each other is relatively small. Therefore, it is difficult for this fin to turn, a gap between the fins that are adjacent to each other is closed in a stable manner, and the ventilation in a ventilation passage can be reliably shut out by way of the fins.

With the air flow direction adjusting device according to the second aspect of the present invention, a contact portion is employed as a recessed portion which is provided in a recessed manner in a thickness direction of a fin main body. In this manner, a gap between the fins that are adjacent to each other can be closed more reliably by way of contact between a protrusion portion and the recessed portion.

With the air flow direction adjusting device according to the third aspect of the present invention, a protrusion portion and a recessed portion are formed in shapes which are different from each other, and the protrusion portion and the recessed portion are constructed so as to come into linear contact with each other. In this manner, a gap between fins which are adjacent to each other can be closed more reliably.

BRIEF DESCRIPTION OF THE DRAWINGS

FIG. 1A and FIG. 1B each show one embodiment of an air flow direction adjusting device of the present invention, wherein FIG. 1A is a plan view showing a part of a fully closed position of the air flow direction adjusting device, and FIG. 1B is a transverse sectional view of FIG. 1A;

FIG. 2A and FIG. 2B each show the same air flow direction adjusting device, wherein FIG. 2A is a plan view showing a part of a fully open position of the air flow direction adjusting device, and FIG. 2B is a transverse sectional view of FIG. 2A;

FIG. 4A to FIG. 4C each show the same fin, wherein FIG. 4A is a perspective view showing a fin when seen from one side, FIG. 4B is a perspective view showing a fin from another side, and FIG. 4C is a perspective view showing a part of a fin;

DESCRIPTION OF THE PREFERRED EMBODIMENTS

Hereinafter, an embodiment of an air flow direction adjusting device and a vehicle air conditioning device, according to the present invention, will be described with reference to the accompanying drawings.

Figure 6:
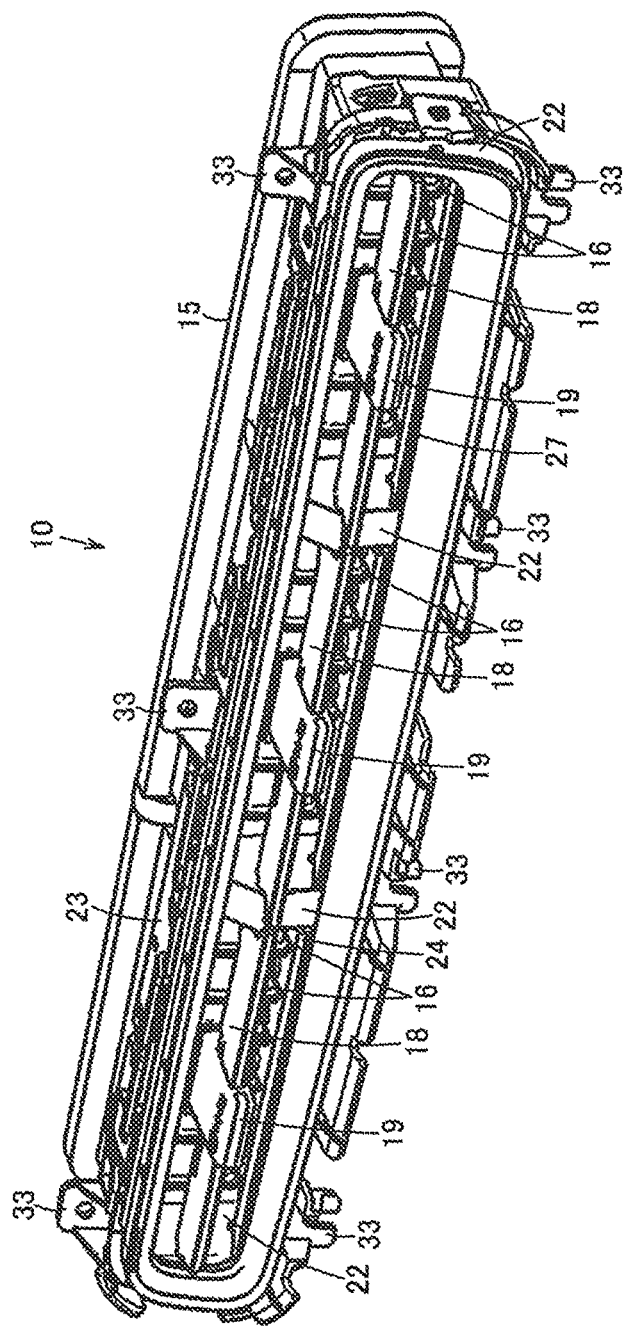
FIG. 6 is a perspective view of a part of the same air flow direction adjusting device.
Figure 7:
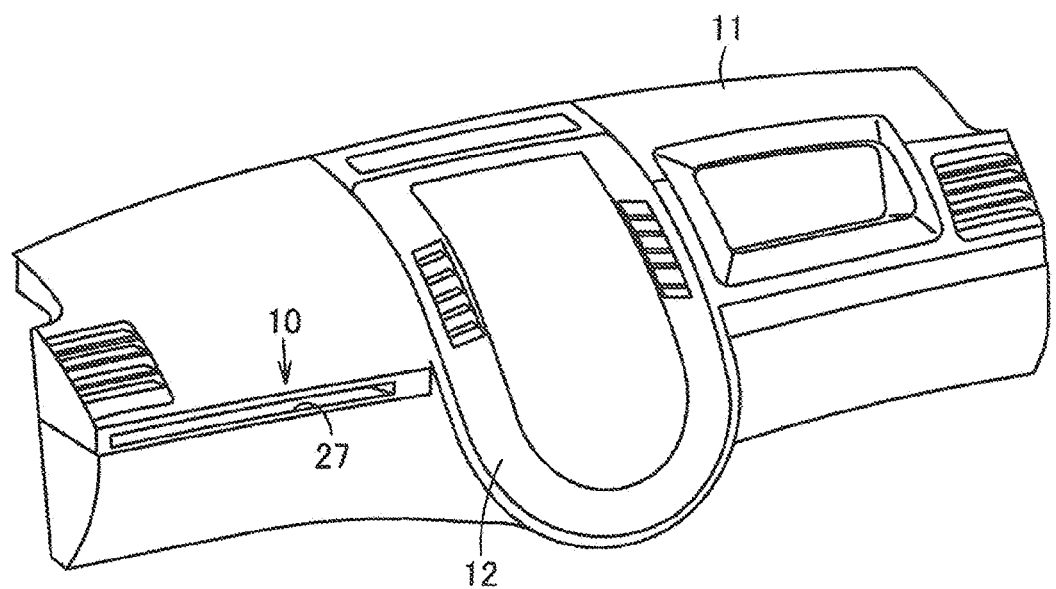
FIG. 7 is a perspective view showing a part of a vehicle in which the same air flow direction adjusting device is installed.

In FIG. 6 and FIG. 7, reference numeral 10 designates an air flow direction adjusting device. This air flow direction adjusting device 10 is also referred to as a louver device or a ventilator or the like, and is mounted to a lateral side or the like of an instrument panel 11 or a center cluster 12 which is a mounted member of an automobile. For example, the adjusting device mentioned above is connected to an air conditioning device, and constitutes a vehicle air conditioning device configured to blow out a flow of air in a vehicle room and carry out air conditioning.

Hereinafter, it is to be noted that a downstream side (a leeward side) on which an air blows out, i.e., an occupant side is referred to as a front side, and an upstream side of an air (a windward side) is referred to as a rear side, and further, with respect to a transverse direction and a vertical direction, a state in which the device is mounted to the automobile mentioned above will be described by way of example.

The air flow direction adjusting device 10, as shown in FIG. 1 to FIG. 7, is provided with: a casing body 15; rear fins 16 which are (first) fins serving as a plurality of (first) air flow direction adjusting vanes which are turnably pivoted to this casing body 15; rear links 17 which are links configured to couple these rear fins 16 thereto; a front fin 18 which is a (second) fin serving as a (second) air flow direction adjusting vane which is turnably pivoted to the casing body 15 at a position which is more forward than that of a respective one of the rear fins 16; and an operating knob 19 serving as an operating portion for operating fins 16, 18.

The casing body 15 is formed in an elongated shape in a transverse direction, and is made of a synthetic resin or the like, for example. That is, this casing body 15 is formed in a flat shape in which a transverse direction is greater than a vertical dimension. This casing body 15 is constructed while a plurality of casing portions are combined with each other. As a whole, the casing body mentioned above is provided with: a plurality of, for example, four longitudinal wall portions 22 which are spaced from each other in a transverse direction, and are taken along a vertical direction; and an upper wall portion 23 and a lower wall portion 24 configured to couple the longitudinal wall portions 22, 22 that are respectively positioned on both of the left and right along a horizontal direction. In addition, the casing body 15 is formed in the shape of a substantial square tube having an axial direction along a forward and backward direction, and an inside of the casing body is a ventilation passage 26, a front side of the casing body is a blowout opening 27, and a rear side of the casing body is a connection opening 28 which is connected to an air duct of an air conditioning device.

Here, in the embodiment, the longitudinal wall portions 22 are positioned at both of the left and right side parts of the casing body 15 and between both of these side parts; a respective one of the ventilation passage 26 and the blowout opening 27 is divided into three sections in a transverse direction; and at a respective one of these ventilation passage 26 and the blowout opening 27, each of which is divided into three sections, a plurality of rear fins 16 and one front fin 18 are disposed to thereby constitute one unit.

Further, at a lower part of the upper wall portion 23 and at an upper part of the lower wall portion 24 of this casing body 15, bearing bodies 31, 32 for pivoting the rear fins 16 are mounted in a longitudinal manner in a transverse direction. At an upper part of the upper wall portion 23 and at a lower part of the lower wall portion 24 of the casing body 15, bracket portions 33 which are mounting portions to be mounted to a vehicle body side via mounting members such as screws, although not shown, are respectively disposed in plurality.

The rear fins 16 are also referred to as longitudinal louvers or the like, and are respectively disposed in a transverse direction each other while a vertical direction is defined as a longitudinal direction, that is, in a direction crossing the flow of air passing through the ventilation passage 26. A respective one of the rear fins mentioned above are also disposed between the longitudinal wall portions 22, 22 of the casing body 15 while six rear fins are employed as one unit, for example. It is to be noted that the constructions of a respective one of the units are substantially equal to each other, and therefore, hereinafter, only one unit will be described, and a duplicate description of the other units is omitted.

The rear fins 16 are respectively turnably pivoted to perpendicular bearings such as circular holes, although not shown, which are respectively formed on bearing bodies 31, 32 of the casing body 15 while a vertical direction, that is, a perpendicular direction, is defined as an axis of rotation. These rear fins which are turnably pivoted thereto are positioned in the ventilation passage 26.

That is, the respective one of the rear fins 16 mentioned above is provided with: a rear fin main body 36 which is a fin main body 36 serving as a first vane portion formed in the shape of a rectangular plate to control the flow of air passing through the ventilation passage 26; a rear turning shaft portion 37 which is a turning shaft portion formed in a cylindrical shape which is protrusively provided in a vertical direction which is a direction crossing the flow of air passing through the ventilation passage 26 in the longitudinal direction of this rear fin main body 36, that is, from both of the top and bottom parts, and which is turnably pivoted in engagement with a perpendicular bearing; and a rear link shaft portion 38 serving as a link shaft body which is spaced rearward from this rear turning shaft portion 37, that is, to the windward side of the ventilation passage 26, and which is protrusively provided from a top end part of the rear fin main body in parallel to this rear turning shaft portion 37. With this construction, the rear fins 16 are turnable in a transverse direction with respect to the casing body 15.

Also, the respective one of the rear fins 16 mentioned above is provided with: an inner portion 41 which is a primary side member (a base member) including the rear turning shaft portion 37 and the rear link shaft portion 38; and an outer portion 42 including a portion other than at least the rear turning shaft portion 37 and the rear link shaft portion 38 of this inner portion 41 and constituting the rear fin main body 36. The inner portion 41 and the outer portion 42 are constructed while these two portions are melded with two colors, for example.

In addition, in the respective one of the rear fins 16 that constitute each unit, on one side of a respective one of the rear fins 16 that is adjacent to each other, a protrusion portion 45 which protrudes in a thickness direction with respect to the rear fin main body 36 is provided. Also, on the other side of the respective one of the rear fins 16 that is adjacent to each other, a recessed portion 46 serving as a contact portion coming into contact with the protrusion portion 45 in a thickness direction with respect to the rear fin main body 36 is provided.

Further, in any one of the rear fins 16, a fan-shaped gear-like (a fin's side) gear portion 48 is integrally provided at a front edge part which is opposite to a rear edge part of the operating knob 19 (the front fin 18). With respect to a rear fin 16 that is adjacent to a rear fin 16 in which this gear portion 48 is provided, an avoidance recessed portion 49 which is an interference avoidance portion for avoiding interference with the gear portion 48 at the time of turning is provided in a recessed manner.

Furthermore, in the embodiment, from a fully open position (a neutral position) at which the rear fins 16 are taken along a forward and backward direction, for example, the rear fins 16 that are employed as one unit operate together, and are turned in a transverse direction, whereby the flow of air is transversely adjusted. Also, a construction is made in such a manner that, at positions at which the front sides of the rear fins 16 each are turned in a leftward direction to its required maximum, the rear fin main bodies 36 at positions which are more rear than those of the rear turning shaft portions 37 of the rear fins 16 sequentially overlap on the rear fin main bodies 36 of the rear fins 16 which are relatively adjacent to each other on a right side, whereby a fully closed position configured to shut out the ventilation passage 26 (the blowout opening 27) is set.

Here, in the present embodiment, among the rear fins 16 that constitute each unit, what is positioned at a left side which is one side is a left rear fin 51, what is positioned at a right side which is the other side is a right rear fin 52, and what are positioned between these left rear fin 51 and right rear fin 52 are a plurality of center rear fins 53, for example.

The rear turning shaft portion 37 is disposed at a position which is spaced from each end part, in a forward and backward direction of a respective one of the rear fins 16, that is, in a direction crossing (orthogonal to) a thickness direction and an axial direction thereof, in other words, in a direction which is orthogonal to a turning direction of the respective one of the rear fins 16 along the rear fin main bodies 36 with respect to a turning direction of the respective one of the rear fin 16. That is, the rear turning shaft 37 is disposed at a position which is proximal to a center part in the forward and backward direction of a respective one of the rear fins 16 (the rear fin main bodies 36).

The rear turning shaft portion 37 of a respective one of the rear fins 16 is positioned on a substantially straight line in a transverse direction, that is, in a direction crossing (orthogonal to) the flow of air passing through the ventilation passage 26, and the thus positioned shaft portion is disposed in the ventilation passage 26.

The inner portion 41 is integrally molded with a member such as a hard synthetic resin, for example. In addition, the inner portion 41 is provided with: a linear shaft-shaped shaft core portion 55 in which the rear turning shaft portion 37 is provided at each end part in a longitudinal manner along a vertical direction; a plate-shaped inner fin portion 56 which is provided integrally with this shaft core portion 55, and constitutes the inside of the rear fin main body 36; and a protrusion portion 57 which protrudes to one side in a thickness direction from an upper end part of this inner fin portion 56, and in which the rear link shaft portion 38 is protrusively provided at an upper end part.

In so far as the inner fin portion 56 is concerned, a plurality of circular hole-shaped opening portions 58, each of which serves as a resin flow passage at the time of thickness removal and at the time of molding the outer portion 42, are opened so as to penetrate in a thickness direction. In addition, in so far as the inner fin portion 56 is concerned, a plurality of square rib-shaped protrusion portions 59 configured to reinforce the inner portion 41 and increase a contact area with the outer portion 42 are protrusively provided in a thickness direction.

The outer portion 42 is molded with a member made of a synthetic resin which is harder and more elastic in material than the member (the synthetic resin) that constitutes the inner portion 41, for example, a thermoplastic polyolefin (TPO) which is an olefin resin-based elastomer, or alternatively, a rubber.

This outer portion 42 includes the shaft core portion 55, the inner fin portion 56, and the protrusion portion 57, of the inner portion 41, and is formed so as to expose the rear turning shaft portion 37 and the rear link shaft portion 38. A plate-shaped outer fin portion 61 which covers the inner fin portion 56 and constitutes the outside of the rear fin main body 36 forms rectification faces 62, 63 of (one side and the other side) of the rear fin main body 36 configured to control the flow of air passing through the ventilation passage 26.

In the present embodiment, the protrusion portions 45 are integrally molded with the outer portion 42 in a respective one of the left rear fin 51 and the center rear fins 53. That is, these protrusion portions 45 constitute a part of the outer portion 42, and are softer in material than the inner portion 41 (the rear turning shaft portion 37 and the rear link shaft portion 38).

In addition, a respective one of the protrusion portions 45 mentioned above is formed in the shape of a linear rib which is continuous to the rear fin main body 36 along a vertical direction. Further, the respective one of these protrusion portions 45 is formed in a polygonal shape, for example, in a square (rectangular) shape in a sectional view in a thickness direction.

That is, the respective one of the protrusion portions 45 mentioned above has a plurality of, for example, two corner portions 45a, 45a which are spaced from each other at positions which protrude in a thickness direction with respect to the rear fin main body 36.

In so far as these protrusion portions 45 are concerned, at a position which is spaced from the rear turning shaft portion 37 to the rear end part's side that is one end part of the rear fin main body 36 in a direction crossing (orthogonal to) this rear turning shaft portion 37 with respect to the rear turning shaft portion 37, the respective one of the protrusion portions mentioned above are disposed on the rectification face 63 on the right side of the rear fin main body 36, that is, at a position which overlaps on the rectification face 62 on the left side of the rear fin main body 36 of the adjacent rear fin 16 on the right side at a fully closed position.

In the present embodiment, the recessed portions 46 are molded in the outer portion 42 in a respective one of the right rear fin 52 and the center rear fin 53. That is, in so far as the recessed portions 46 are concerned, the inner portion 41 is not exposed, and these recessed portions 46 constitute a part of the outer portion 42, and are softer in material than the inner portion 41 (the rear turning shaft portion 37 and the rear link portion 38).

In addition, a respective one of these recessed portions 46 is formed in the shape of a linear groove which is continuous along a vertical direction at a position which is proximal to the rear turning shaft portion 37 of the rear fin main body 36.

That is, the respective one of the recessed portions 46 mentioned above is spaced to the side of the rear turning shaft portion 37 from a front end part which is the other end part of the rear fin main body 36 in a direction crossing (orthogonal to) the axial direction of the rear fin 16. In addition, at a position which is closer to the turning shaft portion 37 than a middle part between the rear turning shaft portion 37 and a front end part, the respective one of the recessed portions 46 mentioned above is disposed on the rectification face 62 on the left side of the rear fin main body 36, that is, at a position which overlaps on the rectification face 63 on the right side of the rear fin main body 36 of the adjacent rear fin 16 on the left side at a fully closed position.

Thus, in so far as a respective one of the center rear fins 53 is concerned, the respective one of the protrusion portions 45 and the respective one of the recessed portions 46 are positioned so as to be opposite to each other with respect to the rear turning shaft portion 37.

Further, the respective one of the recessed portions 46 mentioned above is formed in a trapezoidal shape which gradually extends to the outside in a thickness direction in a sectional view in a thickness direction (from the side of the inner portion 41 to the side of the outer portion 42). That is, the recessed portions 46 respectively have contact faces 46a, 46a, each of which is formed in a shape (a sectional shape) different from that of the protrusion portion 45 (the sectional shape of the protrusion portion 45), and is inclined so as to be depressed in a thickness direction with respect to the rectification face 62 of the rear fin main body 36.

The contact faces 46a, 46a of the recessed portions 46 and the corner portions 45a, 45a of the protrusion portions 45 are configured to overlapping on each other at a full closed position by a predetermined very small amount of interference, for example, by 0.3 mm to 1.5 mm (0.3 mm or more and 1.5 or less).

Therefore, at the fully closed position, the corner portions 45a, 45a of the protrusion portions 45 are respectively brought into pressure contact with the contact faces 46a, 46a of the recessed portions 46, the protrusion portions 45 and the recessed portions 46 come into linear contact with each other in the axial direction while these protrusion and recessed portions slacken each other, and a gap between the adjacent rear fins 16 is closed (shut out).

The gear portion 48 is positioned at a substantial center part among the center rear fins 53. In the embodiment, among the center rear fins 53, the gear portion 48 is provided at a center rear fin 53a at a position which is proximal to a second one with respect to the left rear fin 51 and which is spaced from a third one with respect to the right rear fin 52. This gear portion 48 is disposed at a position which is spaced on a front side opposite to the protrusion portion 45 with respect to the rear turning shaft portion 37, and opposes to a rear part of the front fin 18.

In the embodiment, among the center rear fins 53, the avoidance recessed portion 49 is provided in a recessed manner at the rear fin main body 36 of a center rear fin 53b at a position which is the most proximal to the left rear fin 51, and is configured to avoid interference with the gear portion 48 in proximity to a fully closed position. This avoidance recessed portion 49 is not provided in a recessed manner at the outer portion 42, and is formed in such a manner that the inner portion 41 is bent itself in a recessed manner, and this inner portion 41 is covered with the outer portion 42.

In so far as the left rear fin 51 is concerned, the rectification face 62 that is the left side of the rear fin main body 36 comes into contact with, and overlaps on, at a fully closed position, a front side of the protrusion wall portion 65 serving as (one) contact wall portion which is protrusively provided rightward from the longitudinal wall portion 22 that is adjacent on the left side into the ventilation passage 26, and a gap relative to the protrusion wall portion 65 is closed (shut out).

In so far as the right rear fin 52 is concerned, a contact piece portion 67 which is a plate-shaped lip portion protruding from a rear end part of the rear fin main body 36 to an opposite side to the rear turning shaft portion 37 is integrally molded so as to be substantially in flush with the rectification face 62 at the outer portion 42.

That is, this contact piece portion 67 constitutes a part of the outer portion 42, and is softer in material than the inner portion 41 (the rear turning shaft portion 37 and the rear link shaft portion 38). This contact piece portion 67 is deformed and brought into pressure contact with the longitudinal wall portion 22 on the right side at a fully closed position so as to thereby come into intimate contact with this longitudinal wall portion 22.

Further, on the rectification face 63 of this right rear fin 52, a closing protrusion portion 68 is integrally molded with the outer portion 42. The closing protrusion portion 68, as is the case with the protrusion portions 45, constitutes a part of the outer portion 42, and is softer in material than the inner portion 41 (the rear turning shaft portion 37 and the rear link shaft portion 38). In addition, the closing protrusion portion 68, as is the case with the protrusion portions 45, is formed in the shape of a linear rib which is continuous to the rear fin main body 36 along a vertical direction.

Further, the closing protrusion portion 68 is formed in a polygonal shape, for example, in a square (rectangular) shape in a sectional view in a thickness direction. That is, the closing protrusion portion 68, as is the case with the protrusion portions 45, has a plurality of, for example, two corner portions, although not shown, which are spaced from each other at a position protruding in a thickness direction with respect to the rear tin main body 36.

Furthermore, the closing protrusion portion 68 is disposed on the rectification face 63 on the right side of the rear fin main body 36 at a position which is spaced from the rear turning shaft portion 37 to a rear end part's side which is one end part of the rear fin main body 36 in a direction crossing (orthogonal to) this rear turning shaft portion 37 with respect to the rear turning shaft portion 37.

Still furthermore, in so far as this right rear fin 52 is concerned, the rectification face 63 which is on the right side of the rear fin main body 36 comes into intimate contact with, and overlaps on, at a fully closed position, a rear side of the protrusion wall portion 69 serving as (the other) contact wall portion that is protrusively provided leftward from the longitudinal wall portion 22 that is adjacent on the right side into the ventilation passage 26. In this intimate contact state, the closing protrusion portion 68 come into contact with the closing recessed portion 70 serving as a closed contact portion which is provided in a recessed manner in the protrusion wall portions 69 so as to close a gap between the protrusion wall portions 69.

Here, the closing recessed portion 70, as is the case with the recessed portions 46, is formed in a trapezoidal shape which gradually extends to the outside in a thickness direction in a sectional view in a thickness direction of the protrusion wall portion 69. That is, the closing recessed portion 70 is formed in a shape (a sectional shape) which is different from that of the closing protrusion portion 68 (the sectional shape of the closing protrusion portion 68), and has a contact face, although not shown, which is inclined so as to be depressed in a thickness direction with respect to a rear face of a respective one of the protrusion wall portions 69, as is the case with the recessed portions 46.

A respective one of the contact faces of these closing recessed portions 70 and a respective one of the corner portions of the closing protrusion portions 68 are configured to overlapping on each other at a fully closed position by a predetermined very small amount of interference, for example, by 0.3 mm to 1.5 mm (0.3 mm or more and 1.5 mm or less).

Therefore, at the fully closed position, a respective one of the corner portions of the closing protrusion portions 68 is brought into pressure contact with the respective one of the contact faces of the closing recessed portions 70, and comes into linear contact therewith along the axial direction while the closing protrusion portions 68 that are soft in material relative to the closing recessed portions 70 slacken.

The rear links 17 are configured to turnably couple the rear link shaft portions 38 of the rear fins 16 therewith. Also, a respective one of the rear links 17 is formed in the shape of an elongated rod while a transverse direction which is a disposition direction of the rear fins 16 is defined as a longitudinal direction. In addition, in so far as the rear links 17 are concerned, rear link bearing portions, although not shown, each of which is formed in the shape of a circular hole configured to turnably receive a respective one of the rear link shaft portions 38, are spaced from each other in a longitudinal direction and then the thus spaced bearing portions are opened. Moreover, by way of these rear links 17, the rear fins 16 are turnable in a transverse direction while these rear fins substantially operate together in parallel to each other.

On the other hand, the front fin 18 is also referred to as a lateral louver, and is disposed while a transverse direction (a horizontal direction) is defined as a longitudinal direction. The front fin 18 is turnably pivoted to horizontal bearings 74, 74 such as circular holes formed at a substantial center part in a vertical direction of the longitudinal wall portions 22, 22 of the casing body 15 while a horizontal direction is defined as an axis of rotation, and is positioned in the ventilation passage 26, or alternatively, in the blowout opening 27 that is an end part on the downstream side of the ventilation passage 26.

This front fin 18 is provided with: a front fin main body 75 which is a fin main body serving as a second vane portion formed in the shape of an elongated rectangular plate; and a front turning shaft portion 76 which is a (second) turning shaft portion formed in a cylindrical shape which is protrusively provided in a longitudinal direction of this front fin main body 75, that is, in a transverse direction which is a direction crossing the flow of air passing through the ventilation passage 26 from each end portion in the transverse direction, and which is turnably pivoted in engagement with the horizontal bearings 74, 74. In addition, in the embodiment, this front fin 18 is disposed on one by one basis for each unit of the rear fins 16.

The operating knob 19 is employed as a control portion for use in control and operation by a user such as an occupant of a vehicle when an attempt is made to change the flow of air, and is provided with an operating knob main body 78 which is engaged with the front fin main body 75 of the front fin 18. At a rear side part of this operating knob main body 78, a gear portion 79 formed in the shape of a rack gear (on the operating portion's side) is provided along a transverse direction, and this gear portion 79 meshes with the gear portion 48 of the center rear fin 53 of the central rear fins 16.

In addition, by transversely operating the operating knob 19, it is possible to carry out turning in a transverse direction via the rear links 17 by way of meshing of the gear portions 48, 79 with each other. Further, by vertically operating the operating knob 19, the front fin 18 operates together and turns in a vertical direction and then the flow of air can be adjusted in a vertical direction.

Next, an air distributing operation of vertically and transversely adjusting the flow of air will be described. It is to be noted that the rear links 17 are omitted from FIG. 1 and FIG. 2 for the sake of making its related explanation clearer.

Figure 2A:
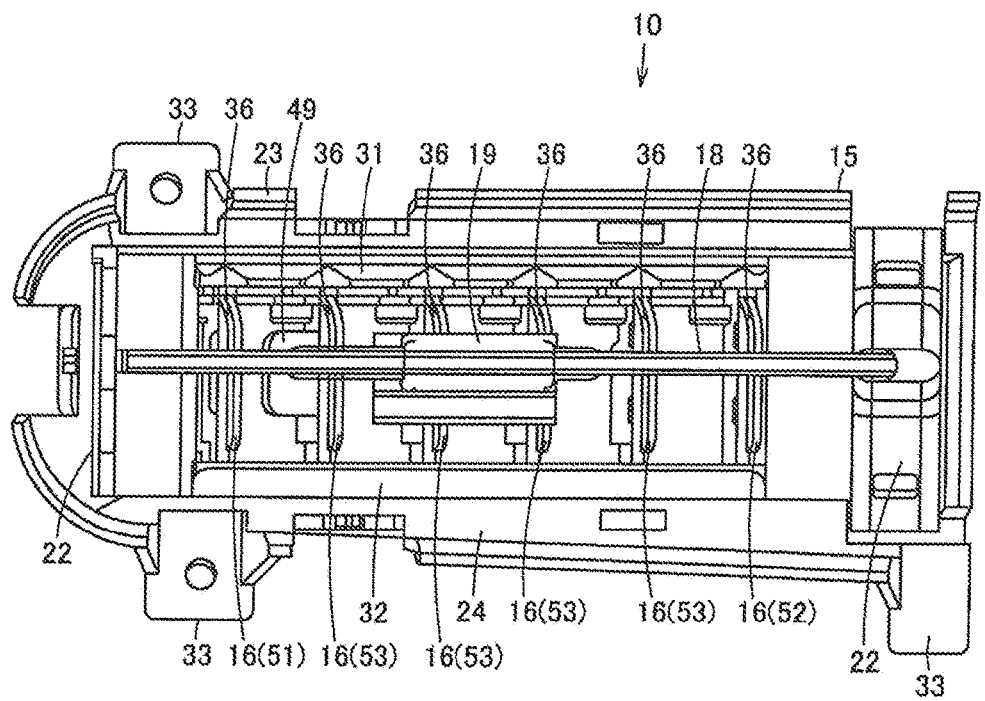
Figure 2B:
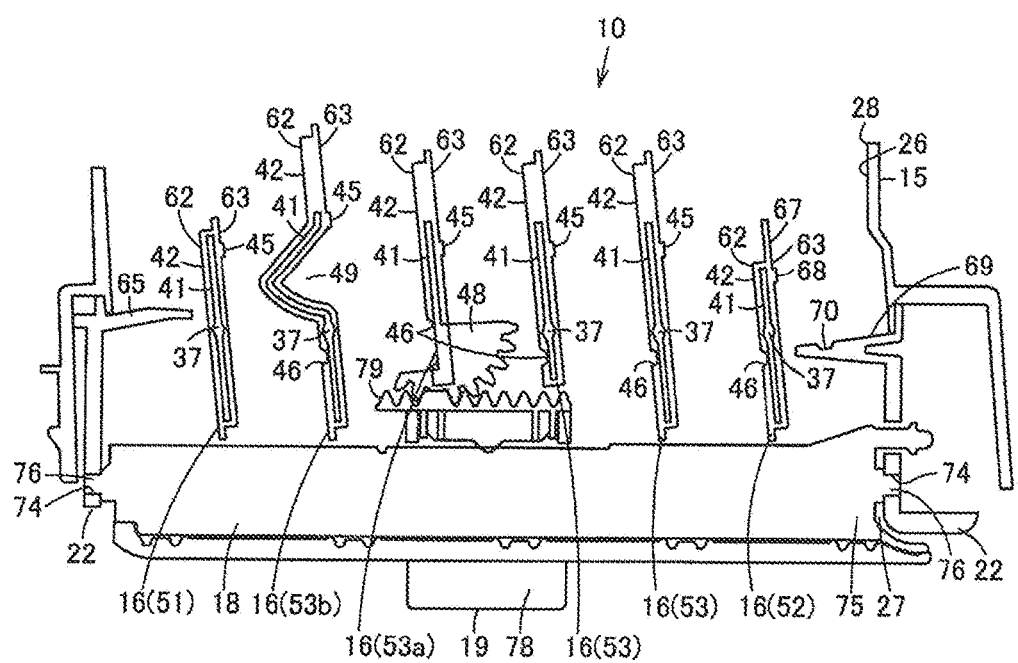
Figure 3:
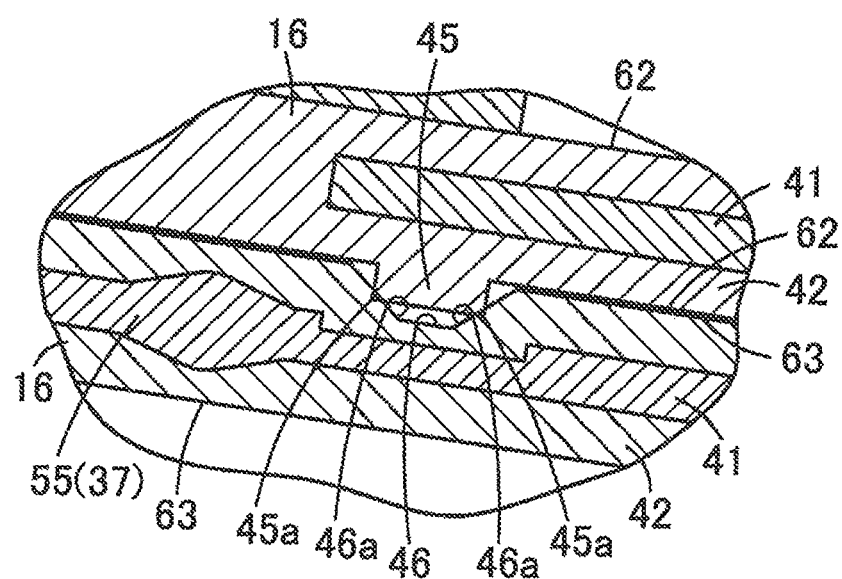
FIG. 3 is a sectional view showing a part of a fin in an enlarged manner.
Figure 4C:
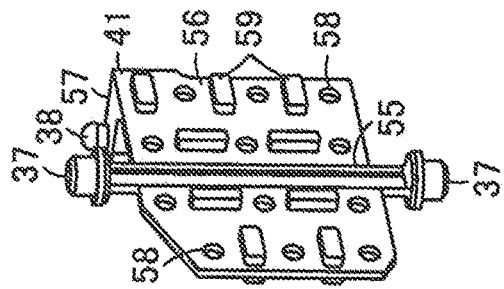
Figure 4B:
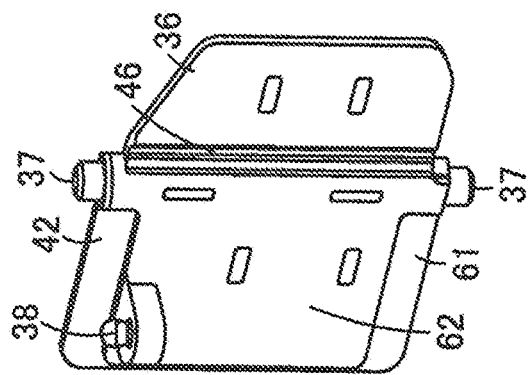
Figure 4A:
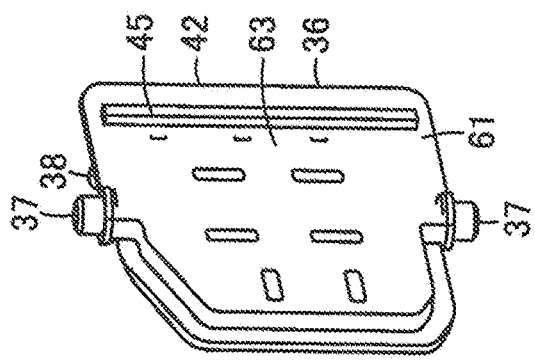
Figure 5:
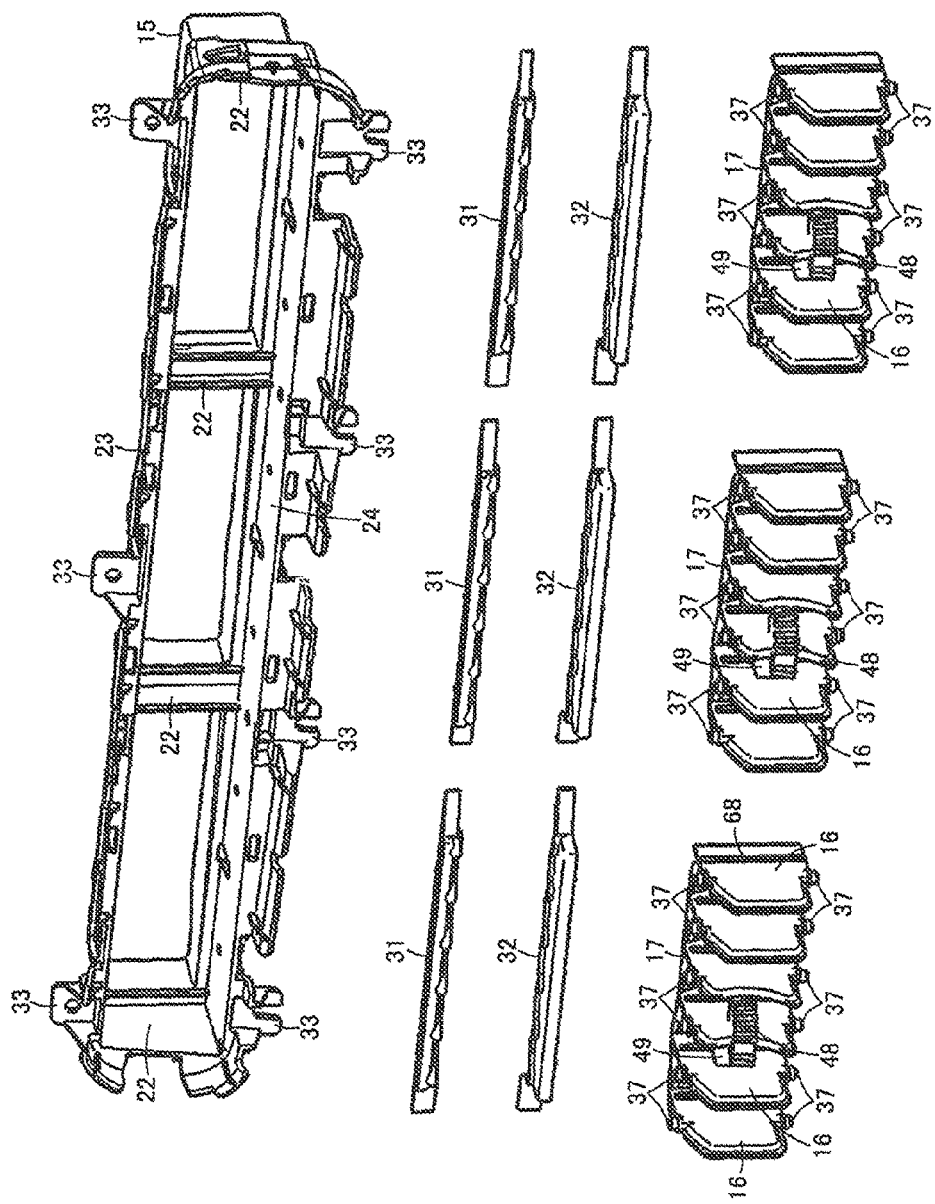
FIG. 5 is an exploded perspective view of a part of the same air flow direction adjusting device.

First, when the operating knob 19 is transversely slid from the fully open position shown in FIG. 2A and FIG. 2B, the gear portion 79 of the operating knob 19 follows the sliding movement and then transversely moves, and directly, the center rear fin 53a provided with the gear portion 48 that is to be engaged with this gear portion 79 is transversely turned around the rear turning shaft portion 37.

Therefore, the rear fins 16 (the rear fins 51, 52, 53), each of which is coupled with this center rear fin 53a by way of the rear link 17, operate together in a state which these rear fins are substantially parallel to each other, and respectively turn around the rear turning shaft portions 37, and the flow of air is transversely changed, that is, is adjusted along the rectification faces 62, 63.

Also, at the time of vertically operating the operating knob 19, the front fin 18 vertically turns around the front turning shaft portion 76, whereby the flow of air is vertically changed, that is, is adjusted.

Therefore, by vertically and transversely operating the operating knob 19, the flow of air is adjusted in an arbitrary direction.

Figure 1A:
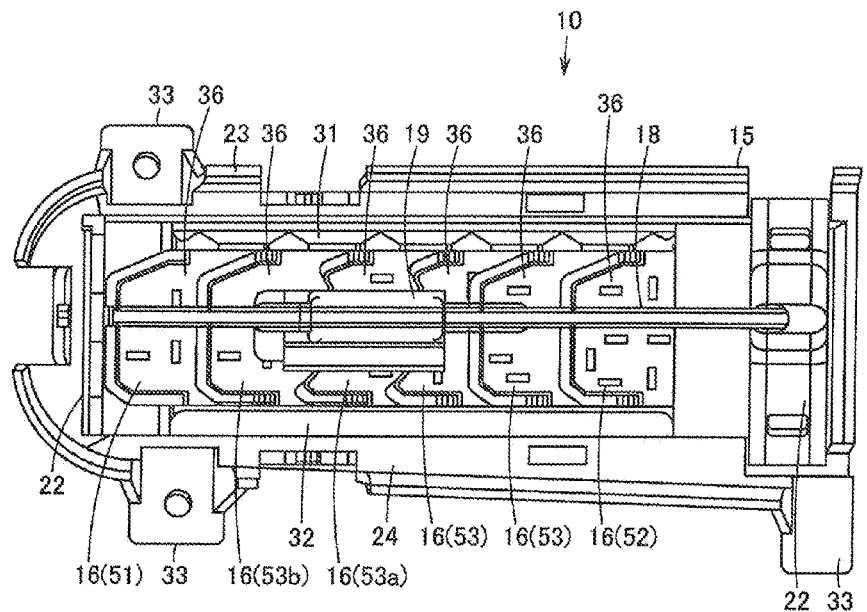
Figure 1B:
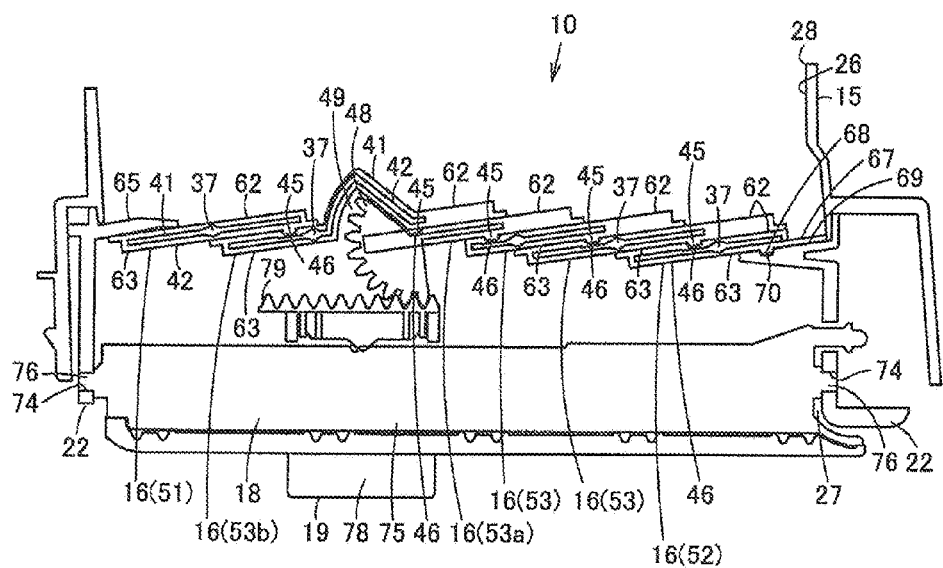

On the other hand, at the time of closing the ventilation passage 26, when the operating knob 19 is slid leftward to its required maximum as shown in FIG. 1A and FIG. 1B in the embodiment, the rear fins 16 (the rear fins 51, 52, 53) turn so that the front side moves leftward and the rear side moves rightward around the rear turning shaft portion 37.

By way of this turning movement, the rectification face 63 on the right side of the rear fin 16 that is relatively positioned on the left side overlaps on the rectification face 62 on the left side of the rear fin 16 that is relatively adjacent on the right side, and the rectification face 62 on the left side of the left rear fin 51 overlaps on the protrusion wall portion 65, and further, while the contact piece portion 67 of the right rear fin 52 is brought into pressure contact with the longitudinal wall portion 22 on the right side while the contact piece portion slackens, the rectification face 63 on the right side of this right rear fin 52 overlaps on the protrusion wall portion 69.

In this state, the corner portions 45a, 45a of the protrusion portions 45 interfere with, by a very small amount of interference, and are linearly brought into pressure contact with, the contact faces 46a, 46a of the recessed portions 46. In this manner, a gap between the rear fins 16, 16 which are adjacent to each other at a position between the protrusion portion 45 and the recessed portion 46 is shut out, and the left rear fin 51 and the protrusion wall portion 65 come into intimate contact with each other, and further, a gap between these left rear fin 51 and protrusion wall portion 65 is shut out.

In addition, the corner portions of the closing protrusion portions 68 of the right rear fin 52 interfere with, by a very small amount of interference, and are linearly brought into pressure contact with, the contact faces of the closing recessed portions 70 of the protrusion wall portion 69, whereby a gap between the right rear fin 52 and the protrusion wall portion 69 is shut out at a position between the closing protrusion portion 68 and the closing recessed portion 70. That is, the rear fins 16 which are adjacent to each other between the protrusion wall portions 65, 69 continuously overlap in sequential order, and the ventilation passage 26 is shut out.

According to the embodiment, a protrusion portions 45 is protrusively provided in a thickness direction at the rear fin main body 36 of one of the rear fins 16 that are adjacent to each other (the rear fin 16 that is relatively on the left side). Also, a recessed portion 46 serving as a contact portion configured to close a gap between the rear fins 16 that are adjacent to each other is provided in proximity to the rear turning shaft portion 37 of the rear main body 36 of the other one of the rear fins 16 that are adjacent to each other (the rear fin 16 that are relatively adjacent on the right side).

In this manner, when the ventilation passage 26 is shut out, even if the recessed portion 46 is subjected to compression of the protrusive portion 45, a torque which is applied to the other one of the rear fins 16 that are adjacent to each other is relatively small, it is difficult for this rear fin 16 to turn (over-stroke), a gap between the rear fins 16 that are adjacent to each other is reliably closed, and the ventilation in the ventilation passage 26 can be reliably shut out by way of the rear fins 16.

Therefore, at a fully closed position, a noise or an air noise (a wind noise) exerted by leakage of the flow of air from a slight gap between the rear fins 16, 16 is not generated, and a stable quality can be assured.

In addition, a contact portion configured to come into contact with the protrusion portion 45 is employed as a recessed portion 46. In this manner, a gap between the rear fins 16 that are adjacent to each other can be closed more reliably by way of the contact between the protrusion portion 45 and the recessed portion 46.

Further, the protrusion portion 45 (the closing protrusion portion 68) and the recessed portion 46 (the closing recessed portion 70) are formed in shapes which are different from each other, and the protrusion portion 45 (the closing protrusion portions 68) and the recessed portion 46 (the closing recessed portion 70) are constructed so as to come into linear contact with each other. In this manner, even in a case where any dispersion in molding of the rear fins 16 takes place, a gap between the rear fins 16 that are adjacent to each other (and a gap between the right rear fin 52 and the protrusion wall portion 69) can be closed more reliably.

The rear fin main body 36 is made of a synthetic resin which is softer in material than the rear turning shaft portion 37. Also, in so far as the rear fin main body 36 is concerned, at least the rear turning shaft portion 37 of the rear fin 16 (the rear turning shaft portion 37 and the rear link shaft portion 38) and the rear fin main body 36 are molded with a synthetic resin in two colors. In this manner, it is possible to easily manufacture the rear fins 16, each of which has the rear fin main body 36 provided with the protrusion portion 45 and the recessed portion 46. In addition, the protrusion portion 45 and the recessed portion 46, each of which is integrally molded with the rear fin main bodies 36, are respectively soft in material, and therefore, the protrusion portion 45 and the recessed portion 46 slacken when these protrusion and recessed portions are brought into (pressure) contact with each other, and finally, these protrusion and recessed portions can be brought into contact with each other with better air tightness.

In particular, the protrusion portion 45 (the closing protrusion portion 68) and the recessed portion 46 (the closing recessed portion 70) interfere with each other at a full closed position by a very small amount of interference. Thus, even in a case where any dispersion in molding of the rear fins 16 takes place, the protrusion portion 45 (the closing protrusion portion 68) and the recessed portion 46, each of which is soft in material, is going to slacken, a dimensional dispersion is absorbed, the protrusion portion 45 (the closing protrusion portion 68) and the recessed portion 46 (the closing recessed portion 70) are reliably brought into contact with each other, and its related ventilation can be shut out.

Therefore, even if any dispersion in molding of the rear fins 16 or the like takes place, it becomes possible to stop ventilation in a stable manner by way of the rear fins 16.

It is to be noted that in a respective one of the foregoing embodiment, the front fin 18 is not a mandatory constituent element. In a case where this front fin 18 is not provided, the operating knob 19 may be directly coupled to any one of the rear fins 16.

In addition, the number of respective ones of the rear fins 16 and the front fins 18 can be appropriately set according to the size or the like of the air flow direction adjusting device 10.

Further, the bearing bodies 31, 32 are not mandatory constituent elements as long as perpendicular bearings can be directly formed at the upper wall portion 23 and the lower wall portion 24 of the casing body 15.

Also, while the rear fins 16 and the front fin 18 were disposed in a transverse direction for a plurality of units, only one unit may be provided depending on the size of the air flow direction adjusting device 10. In this case, there is no need to provide a respective one of the longitudinal wall portions 22 that are positioned between both of the left and right sides of the casing body 15.

In addition, a contact portion may be a protrusive portion which protrudes in a thickness direction from the rear fin main body 36 in place of the recessed portion 46 as long as the contact portion is positioned in proximity to the rear turning shaft portion 37. In this case, the protrusive portion is constructed so as to come into linear contact with the side of the rear turning shaft portion 37 with respect to a side part of the protrusion portion 45. In this manner, functions and advantageous effects which are similar to those of the foregoing embodiment can be attained. Also, the contact portion may be a part of a flat outer portion 42 (the rectification face 62) that does not protrude in a thickness direction with respect to the rear fin main body 36.

Further, a construction may be employed in such a manner that a position at which a front side of a respective one of the rear fins 16 is turned in a rightward direction to its required maximum is a fully closed position at which the ventilation passage 26 (the blowout opening 27) is shut out by way of a respective one of the rear fins 16. In this case, the construction mentioned above can be easily achieved by transversely reversing the construction of the foregoing embodiment.

Moreover, the air flow direction adjusting device 10 can be employed as a part of an arbitrary air conditioning device as well as a part of a vehicle air conditioning device.

INDUSTRIAL APPLICABILITY

The present invention can be applied as an air blowing device of an air conditioning device included in an automobile instrument panel, for example.

What is claimed is:

1. An air flow direction adjusting device comprising:
   a casing body having a ventilation passage inside of the casing body; and
   a plurality of fins which are disposed in a direction crossing a flow of air passing through the ventilation passage, and which is capable of opening and closing the ventilation passage by way of turning operation,
   wherein the plurality of fins includes a first fin and a second fin that are adjacent to each other,
   a respective one of the first fin and the second fin has:
   a turning shaft portion which is turnably pivoted to the casing body; and
   a plate-shaped fin main body configured to control the flow of air passing through the ventilation passage,
   wherein a protrusion portion which protrudes in a thickness direction is protrusively provided at the fin main body of the first fin,
   wherein a contact portion configured to close a gap between the first fin and the second fin that are adjacent to each other by the contact portion coming into contact with the protrusion portion is provided in proximity to the turning shaft portion of the fin main body of the second fin,
   wherein each of the first fin and the second fin is provided with an inner portion which includes the turning shaft portion, and an outer portion which includes the protrusion portion, and
   wherein a predetermined portion of the inner portion, other than the turning shaft portion, is included in the outer portion.

2. The air flow direction adjusting device according to claim 1,
   wherein the contact portion is a recessed portion which is provided in a recessed manner in a thickness direction of the fin main body of the second fin.

3. The air flow direction adjusting device according to claim 2,
   wherein the protrusion portion and the recessed portion are formed in shapes which are different from each other, and come into linear contact with each other.

4. The air flow direction adjusting device according to claim 2,
   wherein the protrusion portion is formed in a linear rib shape which is continuous to the fin main body of the first fin along a vertical direction, and
   the recessed portion corresponds to the protrusion portion, and is formed in a shape of a linear groove which is continuous along a vertical direction at a position which is proximal to the turning shaft portion of the fin main body of the second fin.

5. The air flow direction adjusting device according to claim 2,
   wherein the protrusion portion is formed in a polygonal shape in a sectional view in the thickness direction, and has at least two corner portions, and
   the recessed portion is formed in a shape which gradually extends toward an outside in a sectional view of a thickness direction, and has at least two inclined contact faces for coming into contact with a respective one of the corner portions of the protrusion portion.

6. The air flow direction adjusting device according to claim 5,
   wherein a respective one of the corner portions of the protrusion portion and a respective one of the contact portions of the recessed portion overlap on each other at a predetermined very small amount of interference at a fully closed position configured to close the ventilation passage by way of the first fin and the second fin.

7. The air flow direction adjusting device according to claim 5,
   wherein at the fully closed position configured to close the ventilation passage by way of the first fin and the second fin, a respective one of the corner portions of the protrusion portion comes into contact with a respective one of the contact faces of the recessed portions, and
   the protrusion portion and the recessed portion come into linear contact with each other along an axial direction while the protrusion portion and recessed portions slacken.

8. The air flow direction adjusting device according to claim 2,
   wherein the protrusion portion and the recessed portion are made of a soft material relative so as to slacken when the protrusion portion and recessed portions come into contact with each other.

9. A vehicle air conditioning device comprising:
   a vehicle interior component which is provided inside of a vehicle;
   an air conditioning blowout opening which is provided on a surface of the vehicle interior component, and is configured to blow out a flow of air into a vehicle room; and
   the air flow direction adjusting device according to claim 1, which is provided in the vehicle interior component, which connects to the air conditioning blowout opening to thereby control a flow of air into the vehicle room, and which is capable of shutting out ventilation.

* * * * *